T. BELL.
WHEEL.
APPLICATION FILED SEPT. 8, 1913.

1,120,891.

Patented Dec. 15, 1914.
2 SHEETS—SHEET 1.

Attest:
Wm. H. Scott.
R. M. Lawrence.

Inventor.
Thomas Bell,
By Rippey & Kingsland
attys.

T. BELL.
WHEEL.
APPLICATION FILED SEPT. 8, 1913.
1,120,891.
Patented Dec. 15, 1914.
2 SHEETS—SHEET 2.
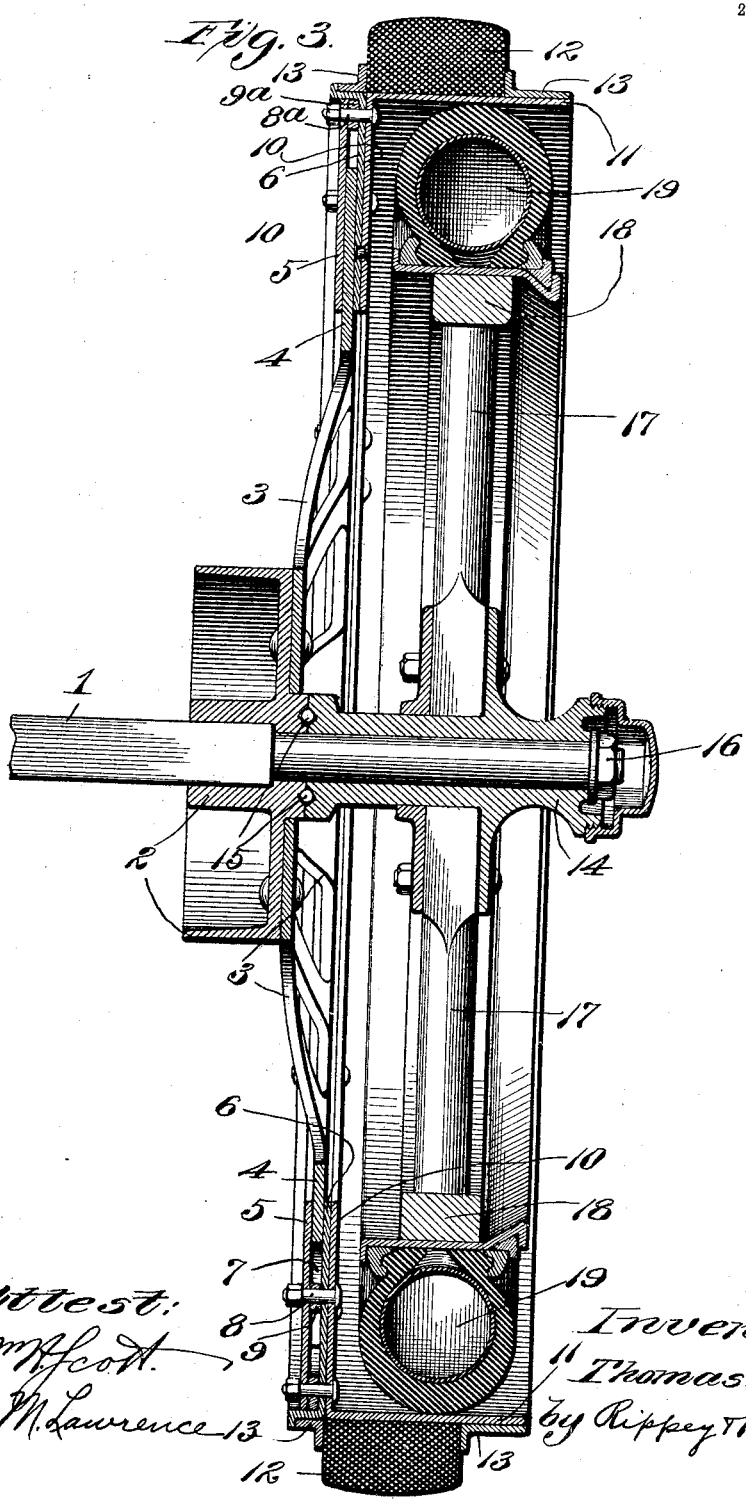
Attest:
Wm. H. Scott.
R. M. Lawrence
Inventor:
Thomas Bell,
by Rippey & Kingsland
Attys

UNITED STATES PATENT OFFICE.

THOMAS BELL, OF ST. LOUIS, MISSOURI.

WHEEL.

1,120,891.   Specification of Letters Patent.   Patented Dec. 15, 1914.

Application filed September 8, 1913. Serial No. 788,525.

*To all whom it may concern:*

Be it known that I, THOMAS BELL, a citizen of the United States, residing at the city of St. Louis and State of Missouri, have invented a new and useful Wheel, of which the following is a specification.

This invention relates to wheels, and has specific reference to vehicle wheels for use on automobiles and the like.

An object of the invention is to provide an improved wheel adapted for use in connection with automobiles and similar vehicles and comprising, in combination with the axle, a wheel driven positively by the axle, and a wheel rotatably mounted upon the axle and constituting an elastic supporting member between the axle and the first-named wheel, whereby the tire of the inner wheel will be permanently kept out of contact with the ground, but will constitute a permanent cushion for the vehicle.

Another object is to provide a wheel comprising an outer wheel portion constituting a tread and arranged to travel upon the ground, with provision for positively driving said wheel from the axle, in combination with a wheel revolubly mounted upon the axle and encircled by the outer rim portion of the first-named wheel, whereby said second-named wheel will constitute an independently supported and independently movable elastic cushion for supporting the weight of the vehicle upon the first-named wheel which travels upon the ground.

Another object is to provide an improved wheel comprising one wheel portion supported upon the axle and arranged to travel upon the ground, in combination with another wheel member also mounted upon the axle and constituting an elastic cushion for supporting the weight of the vehicle upon the first-named wheel, so that the second-named wheel will be permanently protected and retained out of contact with the ground.

With these and other objects in view I have produced a wheel embodying one form of my invention which I have illustrated in the accompanying drawings in which—

Figure 1:
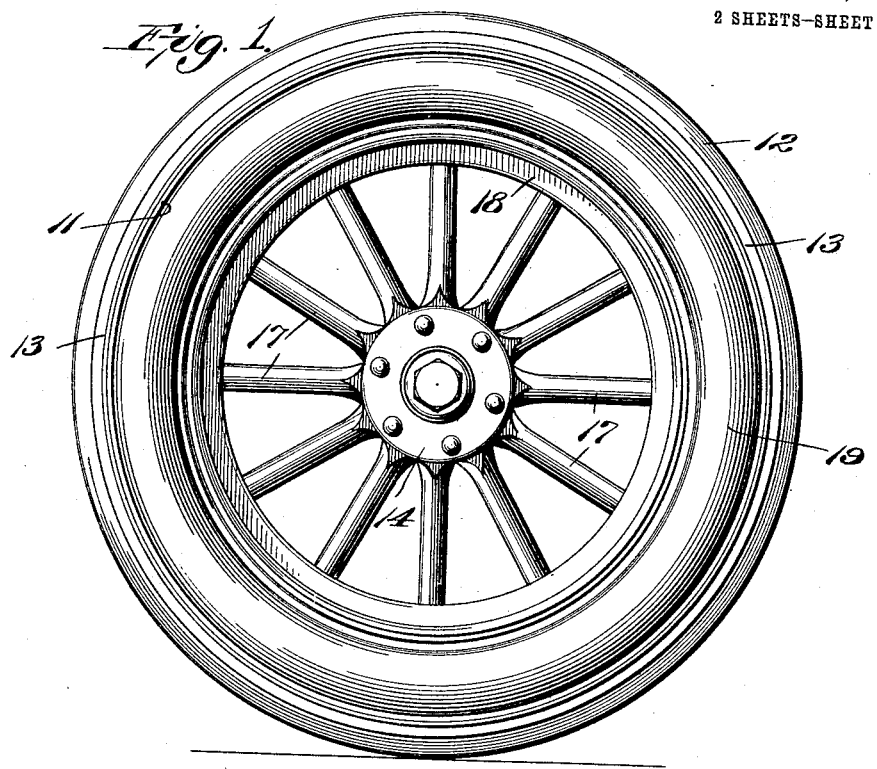
Figure 2:
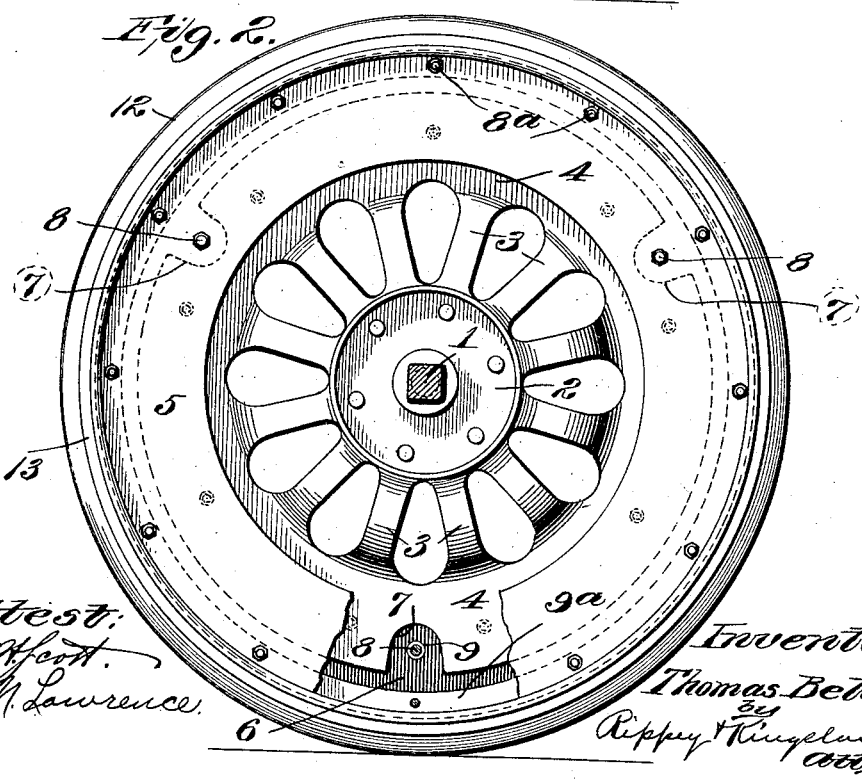

Figure 1 is an outer side elevation of the complete wheel. Fig. 2 is an inner side elevation of the complete wheel, a portion of one of the members being removed to illustrate the construction and arrangement of certain of the parts. Fig. 3 is a sectional view of the wheel.

For purposes of explanation I have illustrated the wheel mounted upon an axle 1, which may be assumed to be the rear axle of an automobile by which the wheels are positively driven. In the embodiment shown the hub and drum member 2 is mounted upon a rectangular or polygonal portion of the axle 1 so that the hub member will be driven by the axle. The support between the hub member 2 and the outer rim portion of the wheel includes a dished plate attached to the hub member 2 and provided with a plurality of radial arms 3 which are integrally connected by a ring portion 4. The arms 3 which perform the functions of spokes in a wheel are in a dished formation as clearly illustrated in Fig. 3. The ring portion 4 at the outer ends of the spokes 3 is confined between an outer plate 5 and an inner plate 6. The ring 4 is enabled to move freely within certain limits with respect to the confining plates 5 and 6, the extent of movement being limited by notches 7 formed in the periphery of the ring 4 and bolts 8 which extend through the confining plates within the notches 7. Washers 9 (Fig. 3) upon the bolts 8 prevent compression of the confining plates upon the ring 4, so that the ring may freely move within the limits permitted by the notches 7. The plates 5 and 6 are in the form of rings, and the plate 5 is encircled by a flange $6^a$ extending laterally upon the periphery of the plate 6. The plate 6 is rigidly attached to a matching member 10, which constitutes an integral portion of the metallic rim or felly member 11. An elastic tire 12 is mounted upon the rim or felly member 11 and constitutes the tread surface of the wheel, being retained thereon by suitable retaining members 13. Relative movement of the ring 4 and the rim structure is further limited by a ring $9^a$ held in position between the plates 5 and 6 by means of bolts $8^a$.

From the foregoing it will be seen that the spokes 3 and ring 4 are positively driven by the axle 1 when used upon the rear axle of an automobile, and that the outer or tire portion of the wheel may move both radially and revolubly with respect to the ring and spokes within the limits permitted by the notches 7 and the bolts 8.

The axle 1 extends outwardly beyond the hub member 2 and supports a hub 14 which is freely revoluble thereon. Friction between the adjacent ends of the hubs may be reduced or prevented by the interposition of a ball-bearing arrangement 15. The hub 14 is retained upon the axle by the nut 16. The hub 14 is provided with the radial spokes 17 supporting a rim or felly member 18 upon which is mounted a pneumatic tire 19. The wheel thus constructed is incased within the rim of the wheel previously described and the tire 19 contacts with the inner surface of the rim member 11, so that the weight of the vehicle will be supported upon the revoluble wheel and transmitted to the outer wheel which constitutes the tread. It will be observed that the inner wheel retains the outer wheel concentrically therewith and concentrically upon the axle. The necessary elasticity is derived by the compression of the tire 19 and the relative movement of the ring 4 between the confining plates 5 and 6 as previously explained. Should the tire 19 become punctured and should the air be exhausted therefrom the compression of the tire will be limited by the depth of the notches 7 and by the bolts 8, so that the tire 19 cannot become entirely flat, as it might be damaged thereby.

It will be understood that I do not restrict myself to a construction in which one of the wheel parts is mounted rigidly upon the axle, and that various other obvious modifications may be utilized as desired.

What I claim and desire to secure by Letters Patent of the United States is:

1. In a wheel, the combination with a hub, spokes radiating from said hub and a ring connecting the outer ends of said spokes provided with notches therein, of two plates embracing said ring and being movable with respect thereto, bolts supported by said plates and adapted to coöperate with the notches in said ring to limit both the relative radial and rotary movement of said plates and said ring, a rim member carried by one of said plates, a tire on said rim, an independent wheel structure, and an elastic tire on said wheel structure engaging against the inner surface of said rim, substantially as described.

2. A wheel comprising a hub, spokes radiating from said hub, a ring connecting the outer ends of said spokes, two plates embracing said ring between them and being movable with respect to said ring, elements supported by said plates limiting movement of said plates with respect to said ring, a rim supported by said plates, and a tire mounted on said rim, in combination with independent wheel structure, and an elastic tire on said wheel structure engaging against the inner surface of said rim, substantially as described.

3. The combination with an axle, and a hub arranged to be driven with said axle, of a ring supported by said hub and arranged to be driven therewith, said ring being provided with a series of notches in the periphery thereof, a rim, elements carried with said rim, coöperating with the said notches to limit relative movement of said ring and said rim, and an independent wheel structure provided with an elastic tire which engages against and supports said rim, substantially as specified.

4. In a wheel, the combination with a hub, and a ring provided with notches supported by said hub, of plates embracing said ring, a rim supported by said plates, elements carried by said plates adapted to coöperate with the notches in said ring to limit relative movement of said ring and said rim, an annular plate embraced between said first named plates limiting outward movement of said ring, and an independent wheel structure having an elastic tire thereon engaging against said rim, substantially as specified.

In witness whereof, I have signed this specification in the presence of two subscribing witnesses.

THOMAS BELL.

Witnesses:
R. M. LAWRENCE,
J. D. RIPPEY.

Copies of this patent may be obtained for five cents each, by addressing the "Commissioner of Patents, Washington, D. C."